No. 861,241. PATENTED JULY 23, 1907.
T. A. EDISON.
PORTLAND CEMENT AND PROCESS OF MANUFACTURING THE SAME.
APPLICATION FILED JUNE 28, 1904.
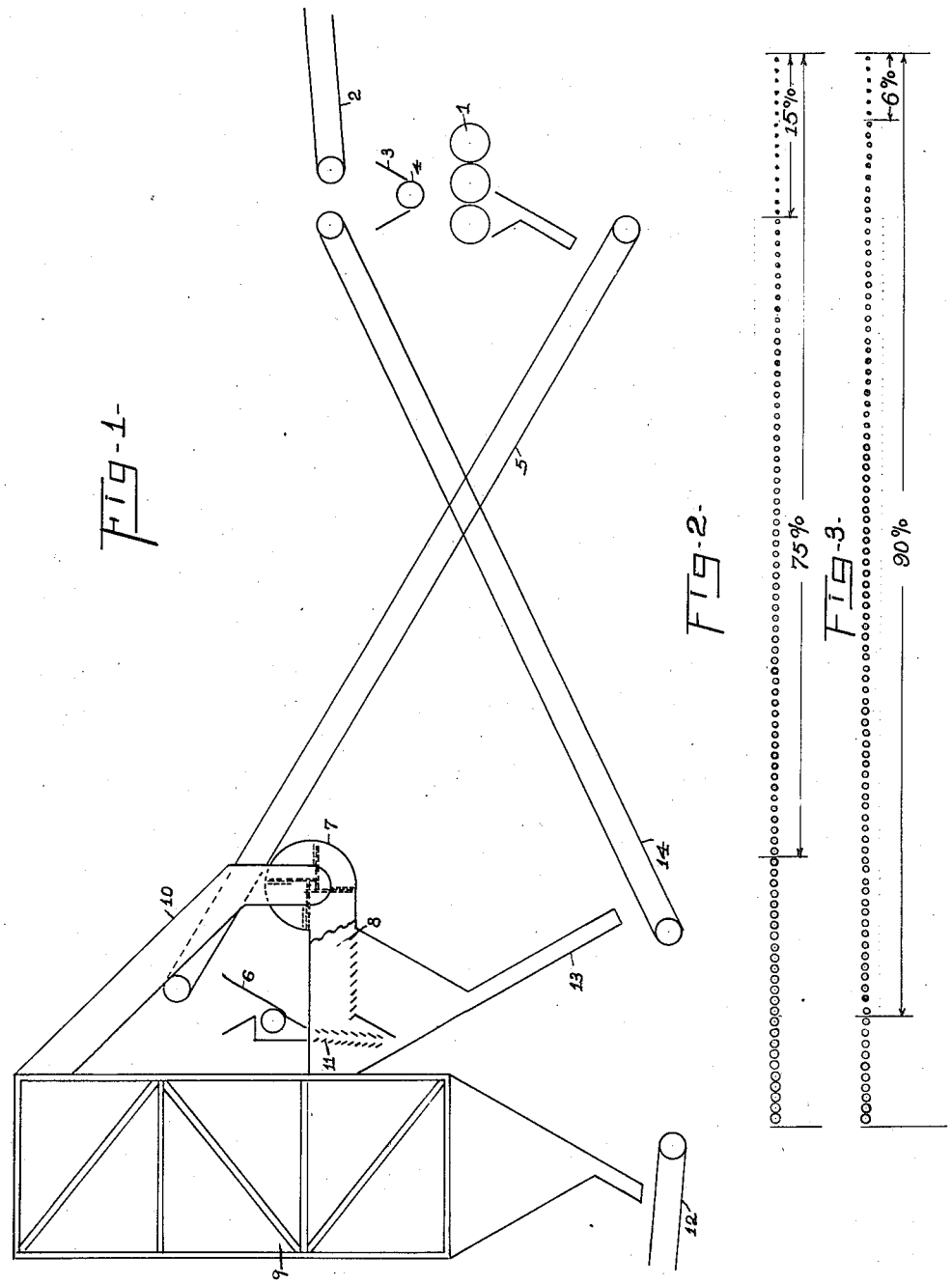
WITNESSES:
INVENTOR
Thomas A. Edison
BY
Frank L. Dyer
ATTORNEY

UNITED STATES PATENT OFFICE.

THOMAS A. EDISON, OF LLEWELLYN PARK, ORANGE, NEW JERSEY.

PORTLAND CEMENT AND PROCESS OF MANUFACTURING THE SAME.

No. 861,241.   Specification of Letters Patent.   Patented July 23, 1907.

Application filed June 28, 1904. Serial No. 214,466.

*To all whom it may concern:*

Be it known that I, THOMAS A. EDISON, of Llewellyn Park, Orange, in the county of Essex, State of New Jersey, have invented a certain Portland Cement and Process of Manufacturing the Same, of which the following is a specification.

In the manufacture of Portland cement as at present carried out, the clinker after being burned in a suitable kiln, is finally ground, generally in a tube or centrifugal mill. In such a grinding apparatus, the particles of clinker are subjected to continuous attrition and become gradually reduced is size, since the particles are necessarily subjected to the constant reducing action of the grinding devices. Consequently, in order to produce a cement of sufficient fineness as a whole, to permit a definite proportion to pass through a screen of standard mesh, a considerable proportion of the cement will exist in the form of an almost impalpable powder, known as "flour". The cement particles range in size from this excessively fine product up to the comparatively large particles which cannot pass through the standard screen. The presence of a considerable proportion of these large particles in a Portland cement is objectionable for the reason that they continue to become hydrated, and expand after the mass as a whole has set, and consequently tend to weaken the mass in time, as is shown by the tests with standard Portland cements, as now made. Although there is continued hydration in the interior of the mass after the outer portions have set, yet in the case of the particles which are of effective size, opportunity is offered for expansion by the interstices presented between the irregularly shaped grains of sand with which the cement is mixed; but in case of the objectionably large particles, the spaces thus presented are not large enough to permit the expansion of such particles during hydration, and in consequence, the expansion tends to disrupt and weaken the mass as explained. On the other hand the presence of a considerable proportion of the excessively fine particles or "flour", in Portland cement, is equally objectionable, for the reason that these very fine particles set almost instantly, or at least before the mixture can be utilized. Heretofore, manufacturers of Portland cement have apparently regarded the presence of "flour" as desirable, but I believe that this opinion is based entirely upon the fact that by securing a relatively large proportion of "flour", the mass as a whole will be more finely ground, and therefore in a desirable condition.

With an average grade of Portland cement produced by present methods, approximately 75 per cent of the particles will pass a 200-mesh screen, and about 15 to 20 per cent of the entire mass is in the form of "flour". With such a cement therefore the most efficient product is that which, while sufficiently fine to pass the standard screen, is still coarser than the "flour", since, as stated, most of the latter product sets too rapidly to be practically available, whereas, the relatively large percentage of comparatively coarse particles which are rejected by the screen, continue to be hydrated, after the mass as a whole has set, with the objection pointed out. The cement in which the entire mass would pass a 200-mesh screen, and in which "flour" was absent, would be theoretically perfect, but such a product cannot be obtained by present methods, for the reason that whenever the attempt is made to reduce the proportion of relatively large particles, the proportion of "flour" is correspondingly increased, whereas, if the attempt is made to reduce the proportion of "flour" the proportion of relatively large particles would be correspondingly increased. It has been found in fact, that if ordinary Portland cement is reduced by the ordinary grinding operations to such an extent that 90 per cent of the product will pass a 200 mesh screen, the cement becomes so quick in setting as to be practically worthless, and furthermore, it cannot be retarded or otherwise controlled in the time of its setting by the use of gypsum.

My improved Portland cement more nearly approximates the ideal conditions, since I greatly reduce the proportion of "flour" and of objectionably large particles, and correspondingly increase the proportion of the most useful material falling between these two extremes. The invention is based on the fact that by employing the so-called 3-high rolls, of the type shown in my Patent No. 637,327 dated November 21, 1899, wherein moving bearings are used with the consequent elimination of most of the friction, and by making the rolls with very narrow faces, (say about 8 inches in width) and by exerting an enormous force holding the rolls together (about 90,000 lbs.), I am enabled to secure a sufficiently great crushing pressure (between 12 and 15 thousand lbs. per square inch) as to crush the cement particles fed in a stream of about 1/2 inch thick. So far as I know, no one prior to my invention of the 3-high rolls ever suggested a practical crushing machine capable of exerting a sufficient pressure to crush (in contradistinction to grinding) Portland cement clinker on a sufficiently large scale and in a sufficiently economical manner to be commercially practicable. In addition to this essentially novel operation of crushing Portland cement clinker, as distinguished from a grinding operation, I perform a novel method in the respect that after the clinker is subjected to a single unitary crushing effect in which the pressure on the clinker exceeds the crushing strength, the crushed particles are subjected to the action of a separator by which the sufficiently fine particles are removed, the mass being again returned to the crusher for recrushing, and the fine material removed from the separator being replaced by fresh material entering the crusher with the returns from the separator. In this way, the cement particles which are sufficiently fine for the purpose, are not subjected to any further reduction in size, as is the case when the mass as a whole is subjected to a grinding operation by present methods. Consequently, with my improved method the proportion of "flour" may be greatly reduced, while at the same time, the proportion of objectionably large particles may be also greatly reduced. Furthermore, the operations may be performed much more economically and on a much larger relative scale than is now possible with present methods. By this method I have obtained cement on a commercial scale in which 90 per cent of the particles will pass a 200 mesh screen, and in which only about 6 per cent of the mass is in a condition of "flour". In other words, with such a cement, about 84 per cent of the mass is in the most desirable condition for effective use, as compared to about 60 per cent with standard Portland cement, as now manufactured. I therefore not only obtain a product in which the proportion of effective particles is largely increased, but by diminishing the proportion of "flour" and of objectionably large particles, I obtain a product showing very superior results in comparative tests with standard Portland cements and having its setting time controllable and of the proper character.

In order that my invention may be better understood, attention is directed to the accompanying drawings forming a part of this specification, and in which:

Figure 1 is a diagrammatic view of a suitable apparatus for carrying the process into effect. Fig. 2 a diagrammatic view illustrating a standard Portland cement obtained by present methods. Fig. 3 a corresponding view illustrating diagrammatically, Portland cement obtained by my improved method.

The crushing rolls 1 are of such a character as to be capable of exerting a crushing pressure sufficient to crush Portland cement clinker, or from 12 to 15 thousand lbs. per square inch, and are preferably of the 3-high roll type shown in my Patent No. 637,327, dated November 21, 1899. A conveyer 2 leading from a suitable stockhouse or other supply, conveys the clinker to a hopper 3, having a roller feed 4. A conveyer 5 leads from the discharge of the crushing rolls 1 to the hopper 6 of a suitable separator. The separator shown is of the type described in my application for Letters Patent filed January 9, 1903, Serial No. 138,428, wherein a fan 7 connects with a flue 8 leading to a settling chamber 9, the upper part of which is in communication with a suction opening of the fan by a conduit 10.
The crushed particles are distributed over the baffle plates 11, and the sufficiently fine particles are blown out by the blast and settle in the chamber 9, being carried off by the conveyer 12. The tailings pass the blast and are deposited through the chute 13, into a conveyer 14, by which they are returned to the hopper 3 of the crushing rolls.

In operation, the material is supplied to the roller feed 4 and is subjected to a single unitary crushing operation in the crushing rolls, being then carried by the conveyer 5 to the hopper 6 from which it is delivered in a thin wide even stream over the baffle plates 11. The sufficiently fine particles are immediately blown out by the blast from the fan 7, while the tailings are returned to the crushing rolls and again pass the same with fresh material, supplied by the conveyer 12. In this way, after the crushing operation, those particles which are sufficiently small are immediately removed instead of being further reduced in size, as heretofore, and consequently, the proportion of "flour" in the resulting mass will be obviously reduced, while at the same time, it will be possible to reduce the proportion of relative large particles. Thus, referring to Fig. 2, I show diagrammatically, a standard Portland cement made by present methods in which 75 per cent is of sufficient fineness to pass a 200-mesh screen, while 15 per cent of the entire mass is in the form of "flour", the objections to which have been indicated.

Referring to Fig. 3, I illustrate diagrammatically a Portland cement such as I have manufactured in practice, wherein 90 per cent of the particles will pass a 200 mesh screen, and in which only 6 per cent is in the form of "flour". Obviously the reason for the large percentage of "flour" in Portland cement as now manufactured is that the subjection of the particles to constant and repeated attrition, gradually reduces the whole mass, whereas, by subjecting the mass to a single unitary crushing operation and by then removing the sufficiently fine particles, this objectionable result is greatly reduced.

In carrying my method into effect, I prefer to employ a separator of the general type indicated, wherein the sufficiently fine particles are removed by the effect of a blast, because in this way, the operations can be carried on effectively at low cost, notwithstanding the excessively fine character of the material under treatment. With such material, a screening operation could not be carried on effectively and economically, since an enormous screening surface would be required, necessitating a large expense for this element alone. Furthermore, a screening operation would be necessarily tedious, and would be repeatedly interrupted by the clogging of the screens and for the making of necessary repairs. A separating operation performed as suggested in my application is, on the other hand, capable of being most effectively carried out in connection with excessively finely divided material like Portland cement. I find in practice that by subjecting the material to the effect of crushing rolls of the 3-high roll type, and by subjecting the crushed material to the effect of a separator of the type referred to, Portland cement can be manufactured more economically than by present methods, wherein the material is merely ground without being screened, or subjected to separating devices, while at the same time, the product is superior in quality and is much more uniform in character than Portland cement heretofore produced.

Having now described my invention, what I claim as new therein, and desire to secure by Letters Patent is as follows:

1. As a new product, crushed Portland cement having no appreciable proportion of ground particles, substantially as set forth.

2. As a new product, crushed Portland cement having no appreciable proportion of ground particles and in which the larger bulk is coarser than "flour" and finer than the tailings of a 200-mesh screen, substantially as set forth.

3. As a new product, crushed Portland cement having no appreciable proportion of ground particles and in which more than 80 per cent of the particles will pass a 200-mesh screen and less than 10 per cent of the mass is in a condition of "flour", substantially as set forth.

4. The process of making Portland cement, which consists in subjecting the clinker to a single unitary crushing operation, whereby the particles are crushed as distinguished from being reduced by grinding, substantially as set forth.

5. The process of making Portland cement, which consists in subjecting the entire mass of clinker successively to a crushing pressure, as and for the purposes set forth.

6. The process of making Portland cement, which consists in subjecting the clinker to a single unitary complete crushing operation, then in removing the sufficiently fine particles and finally, in recrushing the tailings, substantially as set forth.

7. The process of making Portland cement, which consists in subjecting the clinker to a single unitary complete crushing operation, then in removing the sufficiently fine particles, and finally in recrushing the tailings with an added mass of fresh material, substantially as set forth.

8. The process of making Portland cement, which consists in subjecting the clinker to the action of a pair of powerful crushing rolls, then in removing the sufficiently fine particles from the tailings, and finally in recrushing the tailings, substantially as set forth.

9. The process of making Portland cement, which consists in subjecting the clinker to a pair of powerful crushing rolls, then in subjecting the tailings to the effect of an air blast for removing the sufficiently fine particles, and finally in again returning the tailings to the crushing rolls, substantially as set forth.

This specification signed and witnessed this 20th day of June 1904.

THOS. A. EDISON.

Witnesses:
FRANK L. DYER,
MINA MAC ARTHUR.